Dec. 9, 1952 C. D. STONE 2,620,910
FRICTION CLUTCH MECHANISM
Filed Sept. 9, 1948 2 SHEETS—SHEET 1

Inventor
Charles D. Stone
By Clarence A. O'Brien
and Harvey B. Jacobson
Attorneys Dec. 9, 1952     C. D. STONE     2,620,910
FRICTION CLUTCH MECHANISM
Filed Sept. 9, 1948     2 SHEETS—SHEET 2
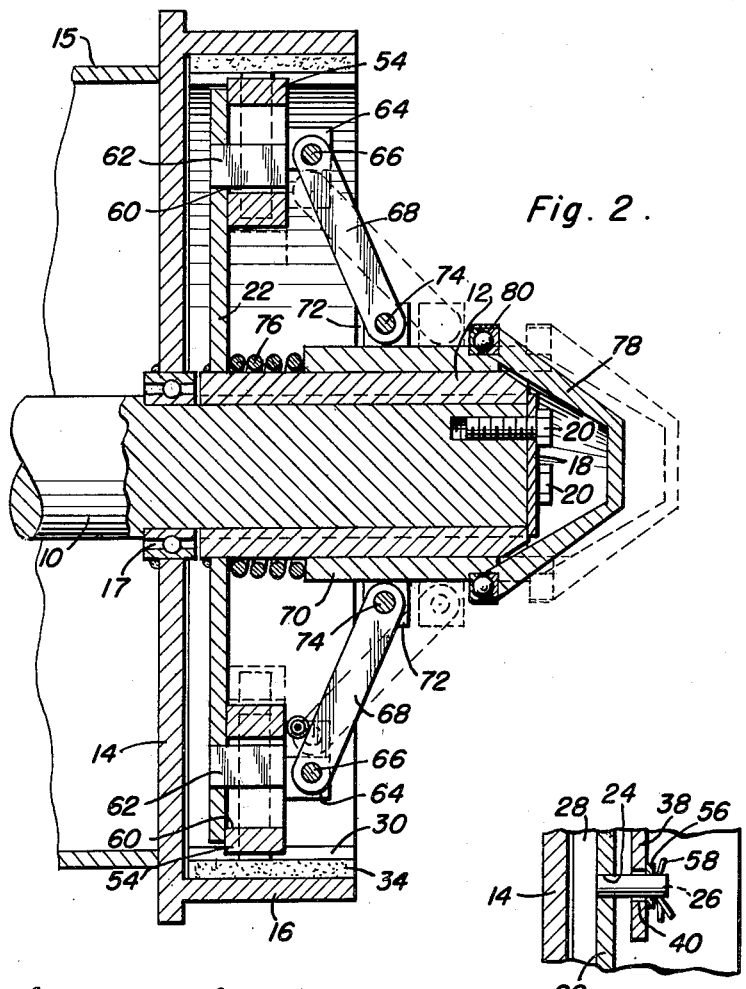
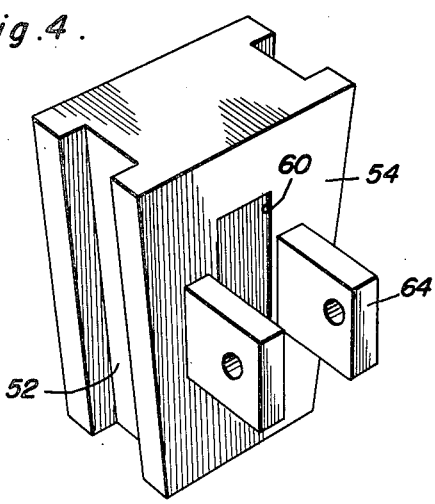
*Inventor*
Charles D. Stone
By *Clarence A. O'Brien and Harvey B. Jacobson*
*Attorneys*

Patented Dec. 9, 1952

2,620,910

UNITED STATES PATENT OFFICE 2,620,910

FRICTION CLUTCH MECHANISM

Charles D. Stone, Boise, Idaho, assignor of fifteen per cent to Earl B. Standley, Boise, Idaho Application September 9, 1948, Serial No. 48,447

9 Claims. (Cl. 192—76)

This invention relates to new and useful improvements in clutch mechanisms and the primary object of the present invention is to provide a double shoe wedge expanded friction clutch for use on power machinery such as cable power control units used to operate dirt moving and grading machinery of the cable controlled design.

Another important object of the present invention is to provide a clutch mechanism for power shovels, cranes, draglines, hoists, donkey engines or any machine where power is transmitted from a revolving shaft to a drum or spool and which is quickly and readily applied to or removed from the drum or spool in a convenient manner.

A still further aim of the present invention is to provide a clutch mechanism including a rotary member, a pair of clutch shoes supporting linings that are normally spaced from the rotary member, and embodying novel and improved wedge means for expanding the clutch shoes to force the linings against the rotary member to control the rotation thereof.

A still further aim of the present invention is to provide a clutch mechanism of the aforementioned character that is simple and practical in construction, strong and reliable in use, neat and attractive in appearance, small and compact in structure, efficient and durable in use, relatively inexpensive to manufacture and install, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a vertical sectional view taken substantially on the plane of section line 2—2 of Figure 1;

Figure 4 is a perspective view of one of the wedge members used in conjunction with the present invention; and, Figure 5 is an enlarged vertical sectional view taken substantially on the plane of section line 5—5 of Figure 1.

Figure 1:
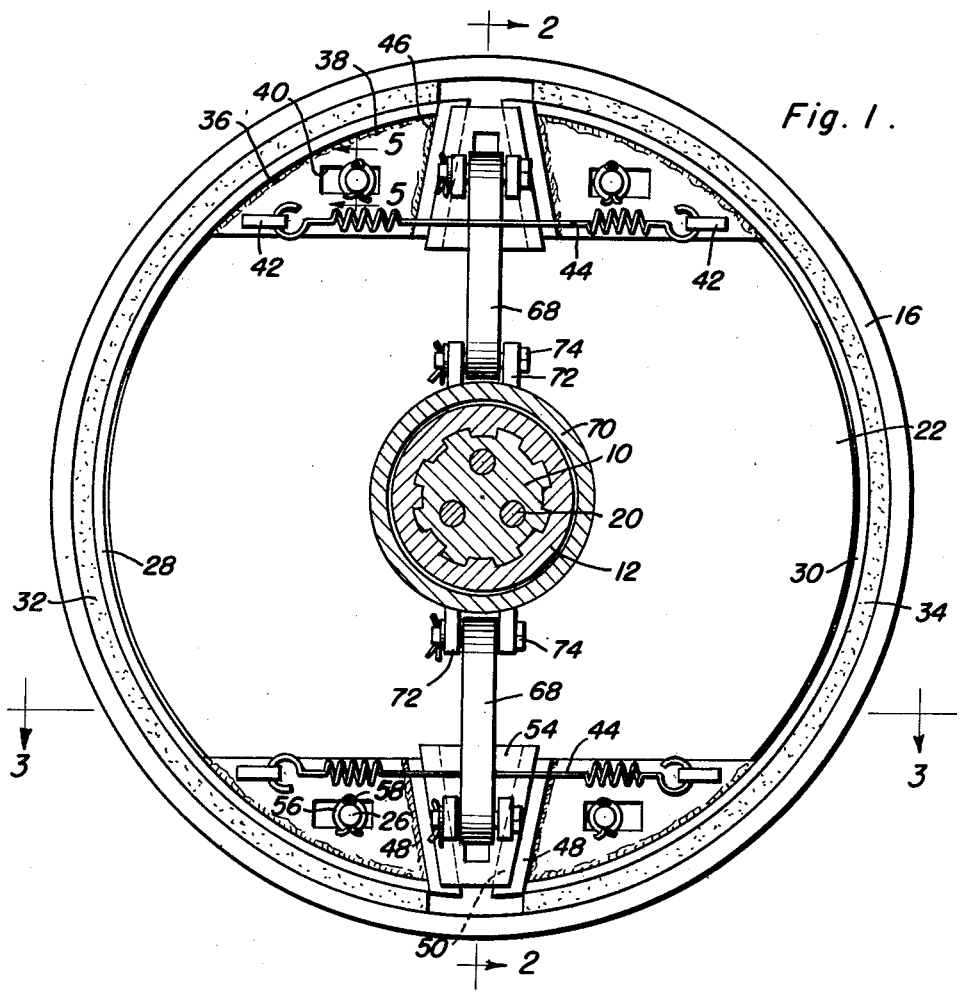
Figure 1 is a front elevational view of the present invention, and with parts of the driving shaft, hub and collar broken away and shown in section for the convenience of explanation.
Figure 3:
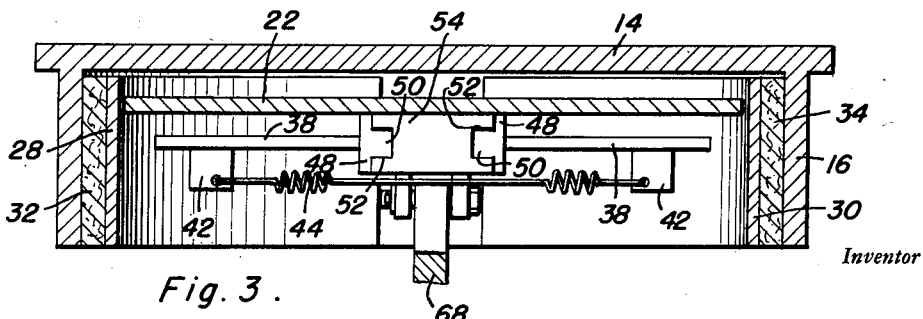
Figure 3 is a horizontal sectional view taken substantially on the plane of section line 3—3 of Figure 1.

Referring now to the drawings in detail, wherein for the purpose of illustration, there is disclosed a preferred embodiment of the present invention, the numeral 10 represents a driving shaft that is driven by any suitable source of power.

Embracing one end of the shaft 10 and splined or keyed thereto, is a hub or sleeve member 12 that is spaced from one end flange 14 of a drum 15. The drum 15 is journaled for rotation on the shaft 10 by a suitable bearing 17 and an annular flanged portion 16 projects outwardly from the flange 14 of the drum. A retainer plate 18 is removably secured to one end of the shaft 10 by bolts or the like 20 and bears against the outer end of the hub 12 to prevent disengagement of the same from the shaft 10.

Fixed by welding or the like to the hub 12 adjacent and spaced from the drum 14 and the flanged portion 16, is a base member or annular plate 22 having pairs of diametrically opposed openings 24 in which there is suitably fixed the inner ends of lugs or pins 26.

The numerals 28 and 30 represent a pair of arcuate, semi-circular clutch shoes to the outer peripheries of which there is suitably secured clutch linings or pads 32 and 34.

The arcuate edges 36 of a plurality of pressure plates or anchor plates 38 are fixed to the ends of each of the clutch shoes 28 and 30 and includes slots 40 that slidably receive the lugs 26 during radial movement of the clutch shoes and linings toward the flanged portion 16 of the drum 14.

Lugs or ears 42 project outwardly from the plates 38 and the plates 38 are arranged in spaced pairs which are connected by spring members 44 having their end portions anchored to the ears 42 to normally urge the clutch shoes and linings inwardly toward each other so that the linings will be spaced from the flanged portion 16 of the drum 14.

Welded or otherwise secured to the inclined edges 46 of the plates 38 are substantially T-shaped plates 48 having ribbed portions 50 that are received in inclined grooves or recesses 52 in the sides of wedge members 54, there being one wedge member 54 between each of the spaced ends of the clutch shoes and linings therefor.

In order to retain the clutch shoes 28 and 30, linings 32 and 34, and plates 38 relative to the base member 22, washers 56 embrace the lugs 26 and bear against the outer faces of the plates 38. Cotter pins 58 extend through transverse bores in the outer free ends of the lugs 26 and hold the washers 56 relative to the plates 38 and lugs 26 (see Figure 5).

The wedge blocks or members 54 are each formed with longitudinal slots 60 that slidably receive diametrically opposed guide lugs 62 fixed to the plate 22 so that the members 54 will be guided in their radial movement.

Pairs of ears 64 project from the outer faces of the wedge members 54 and support removable bolts and nuts 66 that pivotally engage the outer ends of pitmans or pusher links 68.

A collar 70 embraces the hub 12 and is slidable thereon. Pairs of ears 72 project from the collar 70 and support bolts and nuts 74 that pivotally engage the free ends of the pitmans 68.

A coil spring 76 embraces the hub 12 and is biased between the plate 22 and collar 70 to normally urge the collar 70 away from the plate 22 and hence the clutch shoes and linings spaced from the flanged portion 16 of the drum 14.

A cap 78 is secured to the outer end of the collar 70 through the medium of bearing races 80 so that a direct inward force in the cap 78 may be accomplished as the collar 70 is rotating without effecting a rotation to the cap 78.

In practical use of the present invention, the shaft 10 being in rotation the hub 12 and plate 22 are also in rotation and the clutch shoes and linings are spaced from the flanged portion 16, it being understood that the cable receiving drum 15 is not in rotation.

As an inward force is applied to the cap 78, to force the collar 70 inwardly, the wedge members 54 will be moved outwardly to spread the adjacent ends of the clutch shoes and lining, thus expanding the clutch shoes and the linings will bear against the flanged portion 16 of the drum 15 to effect a rotary movement of the drum with the driving shaft 10.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A friction clutch mechanism comprising a driving shaft, a rotary drum journaled on the shaft and having an annular flanged portion, a hub fixed on said shaft, a base member fixed to said hub portion, a pair of arcuate clutch members having linings normally spaced from the inner periphery of said flanged portion, a pressure plate carried by each end of each of said clutch members, means carried by said base member slidably supporting said pressure plates, said pressure plates arranged in spaced pairs, a pair of wedges slidably carried by the base plate and movable radially of the shaft and between pairs of said pressure plates for expanding said clutch members and forcing said linings against the inner periphery of said flanged portion, said wedges having side edges provided with channels therein and said pressure plates including reinforced end edges received in said channels.

2. The combination of claim 1 and resilient means connecting and yieldingly urging said pairs of pressure plates toward each other.

3. The combination of claim 2 wherein said resilient means includes a pair of spring members anchored at their ends to said pressure members.

4. The combination of claim 1 and means for moving said wedges, said means for moving said wedges including a collar slidable and rotatable with said hub portion, pitmans connecting said wedges to said collar, and means normally urging said collar from said drum, an actuating cap about said collar, and bearing races securing said cap to said collar.

5. The combination of claim 4 wherein said last mentioned means includes a coil spring embracing said hub portion and biased between said base member and said collar.

6. A clutch mechanism comprising a driving shaft, a hub fixed on said shaft, a drum rotatably supported on the shaft and having a peripheral flange surrounding said hub, a base plate permanently attached to said hub and confined within said flange, a pair of arcuate clutch members, a pressure plate at each end of said clutch members, said pressure plates being arranged in pairs, each of said pressure plates having an elongated slot therein, said slots being disposed transversely of said shaft, a guide pin associated with each pressure plate, said guide pin being secured to said base plate and paralleling said shaft and received in said slots to guide the plates during sliding movement thereof toward and away from each other, spring means joining pressure plates of each pair, a pair of wedges slidable radially of the shaft and between pairs of said pressure plates, said wedges having elongated openings disposed radially of the shaft, a pair of guide lugs fixed to said base plate and paralleling said shaft, said guide lugs being received in said openings, and means slidable longitudinally on said hub and connected to said wedges for sliding said wedges to expand said clutch members into engagement with said flange, said wedges each including side edges having channels formed therein, said plates including inclined end edges received in said channel.

7. A clutch mechanism comprising a driving shaft, a hub fixed on said shaft, a drum rotatably supported on the shaft and having a peripheral flange surrounding said hub, a base plate permanently attached to said hub and confined with said flange, a pair of arcuate clutch members, a pressure plate at each end of said clutch members, said pressure plates being arranged in pairs, each of said pressure plates having an elongated slot therein, said slots being disposed transversely of said shaft, a guide pin associated with each pressure plate, said guide pin being secured to said base plate and paralleling said shaft and received in said slots to guide the plates during sliding movement thereof toward and away from each other, spring means joining pressure plates of each pair, a pair of wedges slidable radially of the shaft and between pairs of said pressure plates, said wedges having elongated openings disposed radially of the shaft, a pair of guide lugs fixed to said base plate and paralleling said shaft, said guide lugs being received in said openings, a collar slidable on said hub, links terminally pivoted to said collar and said wedges, a spring embracing said hub and biased between said collar and said base plate for urging the collar from the base plate, and an actuating cap freely rotatably supported on said collar and enclosing one end of the shaft for forcing the collar toward the base plate.

8. A clutch mechanism comprising a driving shaft, a hub fixed on said shaft, a drum rotatably supported on the shaft and having a peripheral flange surrounding said hub, a base plate permanently attached to said hub and confined within said flange, a pair of arcuate clutch members, a pressure plate at each end of said clutch members, said pressure plates being arranged in pairs, each of said pressure plates having an elongated slot therein, said slots being disposed transversely of said shaft, a guide pin associated with each pressure plate, said guide pin being secured to said base plate and paralleling said shaft and received in said slots to guide the plates during sliding movement thereof toward and away from each other, spring means joining pressure plates of each pair, a pair of wedges slidable radially of the shaft and between pairs of said pressure plates, said wedges having elongated openings disposed radially of the shaft, a pair of guide lugs fixed to said base plate and paralleling said shaft, said guide lugs being received in said openings, a collar slidable on said hub, links terminally pivoted to said collar and said wedges, a spring embracing said hub and biased between said collar and said base plate for urging the collar from the base plate, an actuating cap about the collar and enclosing one end of said shaft, and bearing races securing the cap to the collar.

9. The combination of claim 6 wherein said wedges comprise tapered blocks having converging side edges, said side edges having grooves therein, said pressure plates having inclined and reinforced edges slidably received in said grooves.

CHARLES D. STONE.

REFERENCES CITED

The following references are of record in the file of this patent:

UNITED STATES PATENTS

| Number | Name | Date |
|---|---|---|
| 375,739 | Flohr | Jan. 3, 1888 |
| 1,806,510 | Vawter | May 19, 1931 |
| 2,071,420 | Napolitan | Feb. 23, 1937 |
| 2,072,755 | Jones et al. | Mar. 2, 1937 |
| 2,090,303 | Napolitan | Aug. 17, 1937 |
| 2,108,235 | Ruffino | Feb. 15, 1938 |
| 2,389,405 | Birchfield | Nov. 20, 1945 |

FOREIGN PATENTS

| Number | Country | Date |
|---|---|---|
| 7,220 | Great Britain | Mar. 3, 1894 |
| 22,347 | Great Britain | Sept. 22, 1894 |